United States Patent [19]

Peters

[11] Patent Number: 4,761,855

[45] Date of Patent: Aug. 9, 1988

[54] DEVICE AND METHOD FOR FILLETING FISH

[75] Inventor: Arthur A. Peters, Roseville, Mich.

[73] Assignee: KAP, Inc., Warren, Mich.

[21] Appl. No.: 21,304

[22] Filed: Mar. 3, 1987

Related U.S. Application Data

[63] Continuation-in-part of Ser. No. 839,092, Mar. 13, 1986, abandoned.

[51] Int. Cl.$^4$ .............................................. A22C 23/16
[52] U.S. Cl. ............................................. 17/46; 17/56; 17/66; 30/313
[58] Field of Search ................. 17/56, 66, 62, 21, 1 G, 17/69, 61, 46, 55; 30/281, 313, 314, 317, 334, 335

[56] References Cited

U.S. PATENT DOCUMENTS

| 1,294,609 | 2/1919 | Boone | 17/69 |
| 1,569,408 | 1/1926 | Spartivento | 30/313 X |
| 3,491,631 | 1/1970 | Skinner | 83/875 X |
| 3,605,178 | 9/1971 | Hoffmann | 30/313 X |

FOREIGN PATENT DOCUMENTS

| 27333 | 2/1985 | Japan | 17/46 |

*Primary Examiner*—Willie G. Abercrombie
*Attorney, Agent, or Firm*—Basile and Hanlon

[57] ABSTRACT

A method and device for filleting fish using an adjustable cutting blade, having a cutting edge mounted between first and second parallel legs which are rigidly connected by a base portion, opposed to the cutting blade. The length and curvature of the blade may be adjusted to conform to the thickness and roundness of the fish to be filleted.

10 Claims, 2 Drawing Sheets

DEVICE AND METHOD FOR FILLETING FISH

RELATED APPLICATION

This application is a continuation-in-part of U.S. application Ser. No. 839,092, filed on Mar. 13, 1986, now abandoned.

BACKGROUND OF THE INVENTION

1. Field of the Invention

The present invention relates in general to a device and method for filleting fish, and more particularly to a device and method for obtaining de-boned fillets in one piece, said filleting device including an adjustable, curved blade with a rearwardly disposed cutting edge.

2. Description of the Prior Art

The usual method of filleting fish, by hand or machine, is to cut through the fish down the line of the bone from the dorsal to the ventral fins, traversing the ribs and severing the connections between pin bones and the ribs. The fillets so produced therefore usually contain a line of pin bones, which may contain a hazard to eating, and generally detract from the satisfaction derived from eating fish.

The processes of filleting fish known thus far are time consuming and often result in the loss of much of the edible flesh of the fish. Even with known methods, because of the skill and time required in the filleting operation, edible flesh is often left attached to the fish skeleton.

Hand tools for cleaning fish utilizing a concave scraper are known for use in eviscerating and removing entrails of fish, for scaling fish, as well as for opening the bellies of fish. For example, Penman U.S. Pat. No. 3,820,196 discloses a hand-held fish filleting tool having a spoon-like work piece with a concave cutting edge which conforms to the ribcage of the fish to be filleted. The spoon-like work piece is mounted on a handle, such that the fillet is forced away from the ribcage of the fish as the device is drawn through the fish's body. The patent to Cowie, et al U.S. Pat. No. 4,037,294 has a series of blades which are used to sever meat from the fish bones and a pair of plows or guides to further force and direct the fillet away from the body of the fish.

Neither of the above-cited patents discloses a device having an adjustable blade which conforms to the contour of the fish to be filleted, the blade being mounted in an essentially U-shaped member or bracket. Blades having concave edges have been used for filleting fish as demonstrated in U.S. Pat. Nos. 3,820,195 and 4,037,294. However, no reference has been found in which the blade is mounted between two legs of a U-shaped member, as is taught by the present invention. Each of the latter two patents are designed to be pushed through the meat of the fish, while the present invention is pulled downwardly from the gill area.

Thus, it would be desirable to provide a device and method for filleting fish which would be relatively inexpensive to produce, yet be adjustable so that the shape of the cutting member can be adjusted to conform to the contours of the fish to be filleted, be relatively easy and safe to operate, and be portable.

SUMMARY OF THE INVENTION

The present invention is a method and device for filleting fish which can be used in situ to fillet a fish very quickly. In operation, a cutting blade of the device is inserted behind the gill of the fish and its shape is adjusted to the thickness and size of the fish by securing one end of the blade to one arm of the device, and the other end to a second arm of the device. The blade can be bowed by selecting the point of attachment of the blade to the second arm. The device is then pulled rearwardly and one-half of the fish is then filleted.

It is expected that the device taught by the present invention will be relatively inexpensive, and will thus be of interest to, and within reach of, many fishermen.

The present invention also discloses a method for filleting fish having gills, a tail, and vertebrae using an adjustable cutting blade having a rearwardly disposed cutting edge adjustably mounted between first and second rigid, parallel legs which are rigidly connected by a base portion, said base being opposed to and parallel to the cutting blade, comprising the steps of: inserting the cutting edge of the blade behind a gill of a fish; grasping the base; and drawing the filleting tool rearwardly toward the tail of the fish and severing a fillet therefrom, wherein the fillet, as it is being severed, passes between the blade and the base.

The device of the present invention comprises a cutting blade, having a rearwardly disposed cutting edge perpendicularly mounted between forward ends of first and second rigid, parallel legs; and a base rigidly connected to the rearward ends of the parallel legs, generally parallel to the cutting blade, wherein the length and curvature of the blade may be adjusted to conform to different sizes and shapes of fish. The legs and base together form a rigid U-shaped frame.

In use, the device is inserted behind the fish at the gill, after the blade has been adjusted to conform generally to the thickness and size of the fish. It is then pulled rearwardly toward the fish's tail, thus severing the fillet from the fish. The fillet passes between the blade and the base as the fish is being filleted.

In alternative embodiments of the device of the instant invention, the filleting device may further comprise a handle. In one embodiment, the base itself forms the handle. In the alternative embodiment, the handle projects rearwardly from the base.

Each of the two rigid legs mounted on opposed ends of the base and project perpendicularly therefrom may be formed with two angular bends such that the plane formed by the blade is slightly inclined to and spaced apart from the plane of the base. This spacing creates a gap between the base and the blade sufficient to permit the passage therethrough of a fillet of fish during the filleting operation. By slightly inclined it is meant that the plane of the blade and the plane of the base intersect each other at an angle of no more than 25°.

The blade of the fillet device of the instant invention may further comprise flat end sections, and the rearwardly disposed cutting edge may be angled with respect to the flat sections. Means for adjusting the length and curvature of the blade may be provided, the means comprising a plurality of spaced apart apertures formed in one of the flat end sections of the blade. A horizontally disposed slot is formed in the projecting end of one of the legs and is adapted to receive one of the flat end sections of the blade therein. A vertically disposed aperture is formed in the projecting end of the one leg and extends through the slot. A pin is provided which is adapted to be threaded through the vertically disposed aperture at the projecting end of the leg. When one of the plurality of apertures in the one end section is aligned with the vertically disposed aperture in the leg, the pin may be threaded through the aligned apertures, thereby fixing the length and curvature of the blade.

BRIEF DESCRIPTION OF THE DRAWING

The various features and advantages of the present invention will become more apparent by referring to the following detailed description and drawing in which.

DESCRIPTION OF THE PREFERRED EMBODIMENTS

Figure 4:
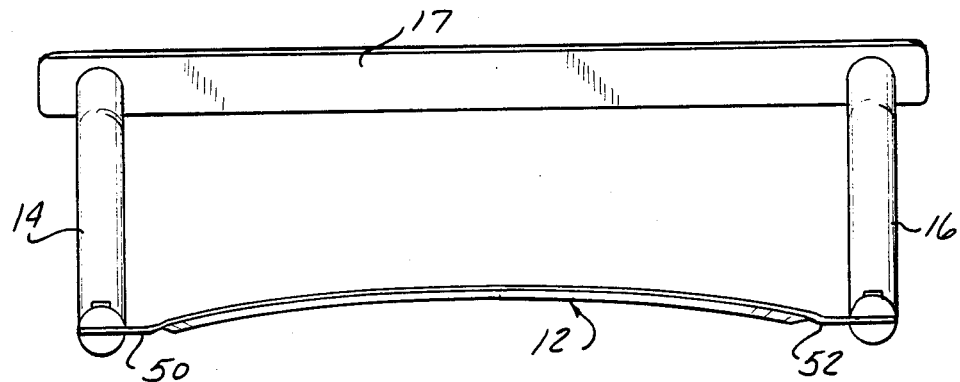
FIG. 4 is a perspective, front view of the embodiment of the fish filleter shown in FIG. 1.

Throughout the following description and drawing, an identical reference number is used to refer to the same components shown in multiple figures of the drawing.

Figure 1:
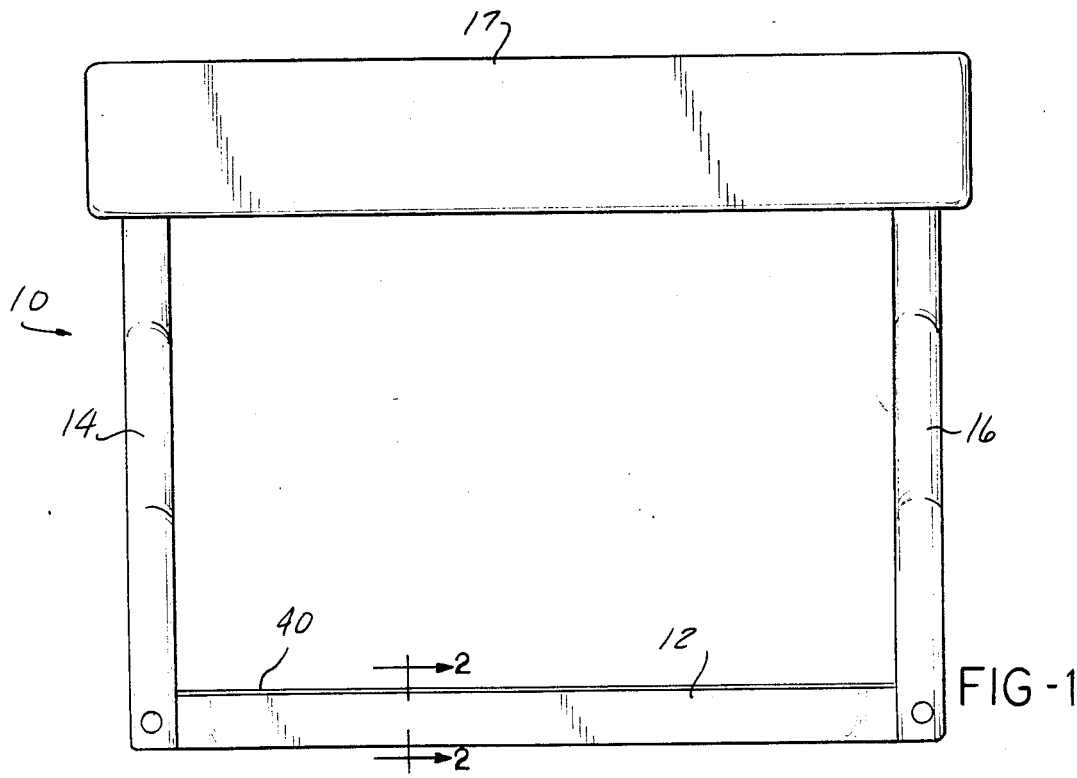
FIG. 1 is a plan view showing the fish filleter of the present invention.

Referring now to the drawings, and more particularly to FIG. 1, there is illustrated a fish filleter 10 which is suitable for insertion behind the gill of the fish. The device has an adjustable, rearwardly disposed cutting blade 12, perpendicularly mounted betwen two parallel legs 14 and 16. A base 17 connects the two legs 14 and 16, and is opposed and parallel to the cutting blade 12.

Figure 5:
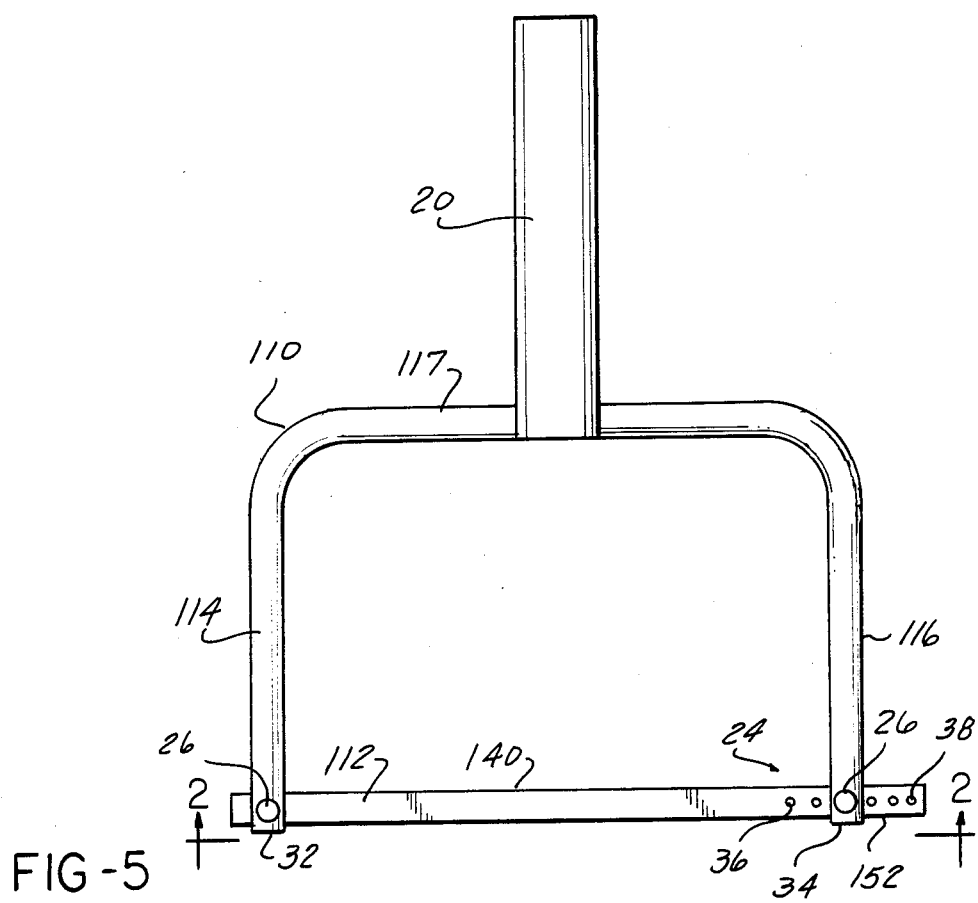
FIG. 5 is a plan view showing an alternative embodiment of the fish filleter of the present invention with a rearwardly projecting handle.

In the embodiment of the fish filleter of the instant invention shown in FIG. 1, the base 17 forms a handle which is grasped during the filleting operation. An alternative embodiment of a filleting device 110 constructed in accordance with the principals of the instant invention as illustrated in FIG. 5. In the alternative embodiment, a handle 20 is mounted onto and projects rearwardly from a base 117. Parallel and opposed legs 114 and 116 are mounted on the opposed ends of base 117. A blade 112 is mounted to the projecting ends of the legs 114 and 116. Blade 112 has a rearwardly disposed cutting edge 114.

Figure 6:
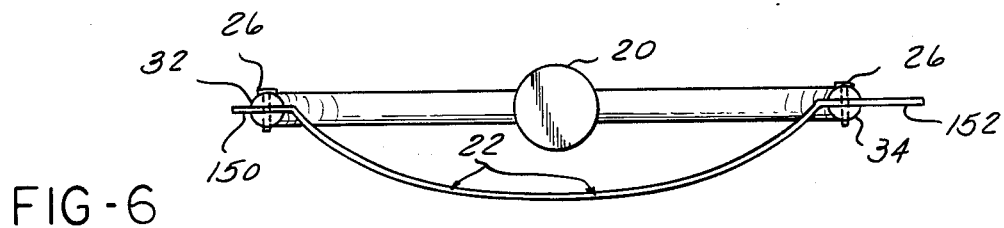
FIG. 6 is a front view of the blade of the device.

The cutting blade 112 has a concave or bowed shape 22, as depicted in FIG. 6, corresponding to the shape of the meaty portion of the fish. The blade 112 is provided with flattened and sections 150 and 152. Blade adjustment is accomplished using a series of spaced holes 24, shown in FIG. 5, formed in the flattened end section 152 of the blade 12. Attachment means 26 are inserted through a hole 28 which traverses slot 30, defined at the forward ends 32 and 34 of the legs 114 and 116, respectively, thus pinning the cutting blade 112 into the slots 30.

To achieve a bowed shape 22 to cutting blade 112, a hole within the series of spaced holes 24 is selected for affixation to leg 116 by attachment means 26 within hole 28 of slot 30. To achieve a more rounded shape 22 to conform to the girth of a more meaty fish, a hole placed more closely to distant hole 38 is selected for affixation to forward end 34 of leg 16.

Figures 2, 3:
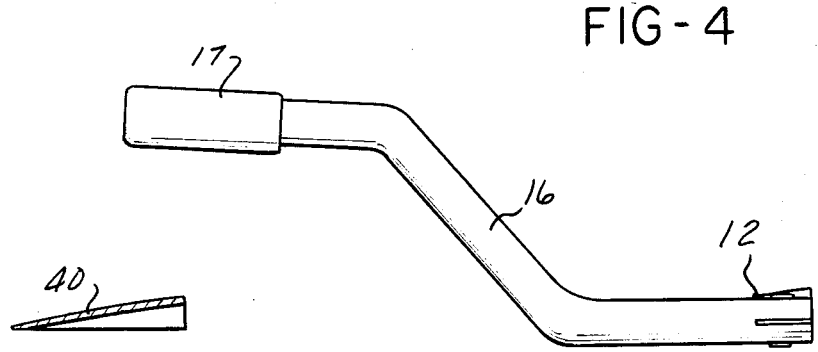
FIG. 2 is a cross sectional view of the blade of the device along line 2—2 of FIG. 1.
FIG. 3 is a side view of the fish filleter of FIG. 1.

The device 10 shown in FIG. 1-4 has a cutting edge 40 on blade 12 which, when the filleter 10 is grasped and pulled toward the tail section of the fish, begins the severance of the flesh behind the gill from the vertebrae of the fish. As shown in FIG. 2, the cutting edge 40 of the blade 12 may be angled with respect to flat portions 50 and 52 formed on the ends of blade 12. The angle of the cutting edge 40 of the blade 12 allows an easier filleting operation because cutting edge 40 may penetrate and sever the fillet from the fish without the necessity of pressing down on the device 10. The device 10 may remain in a relatively horizontal plane during the filleting operation.

Figure 7:
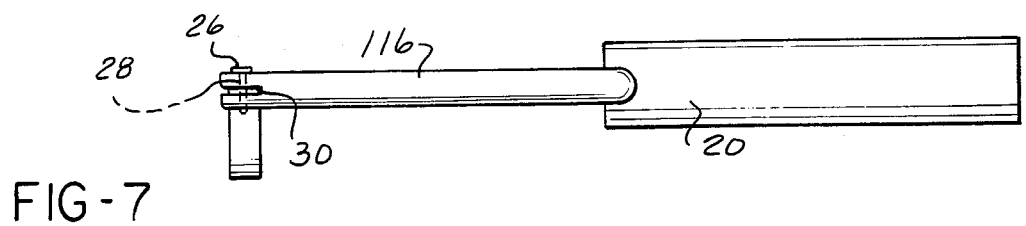
FIG. 7 is a side view of the embodiment of the fish filleter illustrated in FIG. 5.
Figure 8:
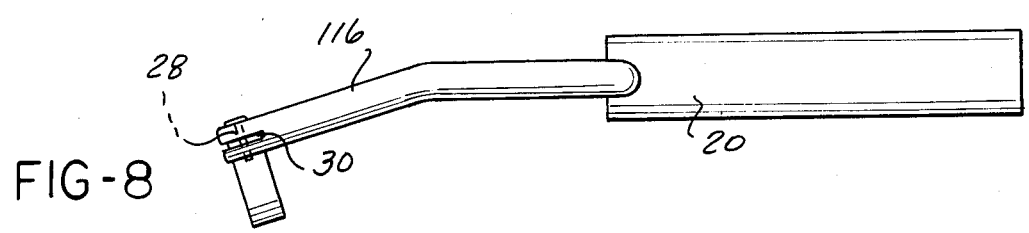
FIG. 8 is a side view of an alternative embodiment of the fish filleter.

As shown in FIGS. 3, 7 and 8, the filleter 10 can be either flat in horizontal section, or in an alternative embodiment, each leg may include either one or two angular bends so that the forward portion of each leg lies is inclined upward or downward to the rearward portion of each leg, or so that the blade is substantially parallel to and spaced apart from the base 20. The arrangement provides a gap for the fillet to pass through as it is being separated from the fish. Typical angles of the two bends shown in the embodiment illustrated in FIG. 3 would be a 140° angle for the top bend and a 130° for the bottom end. In this case, the plane occupied by the base 17 would be only about 10° out of parallel from the blade 12.

In summary, there has been disclosed a unique fish filleter which provides a convenient, efficient, and safe means for filleting fish. The filleter is uniquely suited for use in filleting operations in situ, without significant risk to the operator's safety because the cutting edge 40 lies generally within the area defined by base 18 and legs 14 and 16. This ensures added safety of operation, which is enhanced by the ability to adjust the shape of blade 12 according to the contours of the fish to be filleted.

What is claimed is:

1. A device for filleting fish comprising:
   a unitary base having opposed ends;
   a pair of opposed and parallel rigid legs attached to the opposed ends of the base and projecting perpendicularly therefrom, said legs and said base together forming a rigid frame, and
   a cutting blade adjustably mounted on projecting ends of the legs, the blade having a rearwardly disposed cutting edge thereon, said cutting blade having a length and a curvature which may be adjusted to conform to different sizes and thicknesses of fish.

2. The device of claim 1 further comprising a handle.

3. The device of claim 2 wherein the base forms the handle.

4. The device of claim 2 where the handle projects rearwardly from the base.

5. The device of claim 1 wherein each of the two rigid legs is formed with two angular bends such that the plane formed by the blade is slightly inclined to and spaced apart from the plane of the base creating a gap therebetween sufficient to permit the passage therethrough of a fillet of fish during the filleting operation.

6. The device of claim 1 wherein the blade further comprises flat end sections and the cutting edge is angled wtih respect thereto.

7. The device of claim 1 further comprising means for adjusting the length and curvature of the blade.

8. The device of claim 7 wherein the means comprises:

a plurality of spaced apart apertures formed in one of the flat end sections of the blade;

a horizontally disposed slot formed in the projecting end of one of the legs adapted to receive the one of the flat end sections of the blade therein;

a vertically disposed aperture formed in the projecting end of the one leg and extending through the slot; and a pin adapted to be threaded through the vertically disposed aperture, wherein, when one of the plurality of apertures in the one end section is aligned with the vertically disposed aperture in the leg, the pin may be threaded through the aligned aperture, thereby fixing the length and curvature of the blade.

9. A device for filleting fish comprising:

a base having opposed ends, said base forming a handle;

a pair of opposed and parallel rigid legs attached to the opposed ends of the base and projecting perpendicularly therefrom, said legs and said base together forming a rigid frame, each of the two rigid legs being formed with two angular bends such that the plane formed by the blade is slightly inclined to and spaced apart from the plane of the base creating a gap therebetween sufficient to permit the passage therethrough of a fillet of fish during the filleting operation;

a cutting blade adjustably mounted on projecting ends of the rigid legs, the cutting blade having a rearwardly disposed cutting edge formed thereon and flat end sections, the cutting edge being angled with respect to the end sections; and means for adjusting the length and curvature of the blade including:

a plurality of spaced apart apertures formed on one of the flat end sections of the blade;

a horizontally disposed slot formed in the projecting end of one of the legs adapted to receive the one of the flat end sections of the blade therein;

a vertically disposed aperture formed in the projecting end of the one leg and extending through the slot; and a pin adapted to be threaded through the vertically disposed aperture, wherein, when one of the plurality of apertures in the one end section is aligned with the vertically disposed aperture in the leg, the pin may be threaded through the aligned apertures, thereby fixing the length and curvature of the blade.

10. A method for filleting fish comprising the steps of:

providing a filleting tool formed of a rigid U-shaped frame with opposed legs and a base and a cutting blade adjustably disposed between the ends of the legs, the curvature and length of the blade being adjustable and the blade being so provided with a rearwardly disposed cutting edge;

inserting the cutting edge of the blade behind a gill of a fish;

grasping the base of the U-shaped frame; and drawing the filleting tool rearwardly toward the tail and severing a fillet from the fish, wherein the fillet, as it is being severed, passes between the blade and the base.

* * * * *